July 30, 1957
A. ØGREY
2,801,401
ELECTRICAL COUPLING DEVICE
Filed June 2, 1955
FIG.1.
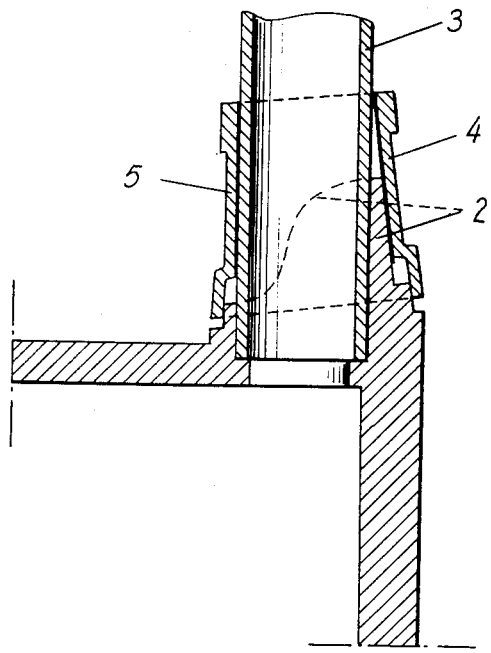
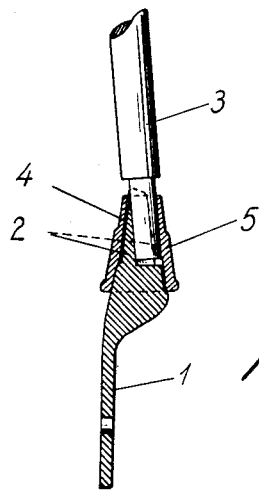
FIG. 2.
Inventor
ARNE ØGREY
By *Albert Jacobs*
Attorney

United States Patent Office 2,801,401
Patented July 30, 1957

2,801,401

ELECTRICAL COUPLING DEVICE

Arne Øgrey, Bryne, near Stavanger, Norway

Application June 2, 1955, Serial No. 512,845

6 Claims. (Cl. 339—268)

This invention relates to an improved device for electrical junction boxes, with one or more connecting branches.

The primary object of the present invention is to provide a simple coupling device which will eliminate the necessity of threading the ends of metal conduits and which at the same time will afford good contact and thus give electrical continuity. Where a conduit or tube is connected to a junction box it is no longer necessary to thread the tube end, and a good electrical contact is made even if the tube is coated with varnish. The coupling device is also useful in connection with contact sleeves for electric cable ends, the cable in this instance taking the place of the tube.

According to the invention a coupling device for electrical junction boxes comprises at least one tubular connecting branch thereto having an outer wall of a truncated conical shape, a gap in one side of said wall to expose part of a tube end placed therein, an interiorly threaded truncated conical sleeve to engage said tubular branch the threads of said sleeve cutting into the tube and forming threads thereon when the sleeve is screwed to the branch, whereby simultaneous locking of the tube and electric continuity between tube and box is attained. To avoid threading of the walls of the truncated cone connecting branch walls may have longitudinally disposed projecting ribs so that when the sleeve is applied the threads thereon will simultaneously cut threads in the tube or cable and in the ribs. In this way threading on the connecting branches is unnecessary.

Two examples of coupling device according to the invention are shown in the accompanying drawing, wherein:

Figure 1 shows in longitudinal section a branch of a junction box with a coupling sleeve and a tube in place.

Figure 2 shows a similar section through a cable shoe.

Referring more particularly to Figure 1 of the drawing, 1 indicates a junction box provided with a connecting branch 2 shaped as a hollow truncated cone with the wall partly on one side, as shown by the dotted line, in such a way as to expose a portion of a tube end 3 at one side, the other side of the tube bearing against the inner side of the branch 2. The outer truncated conical wall of the branch may be threaded, but in the example illustrated the thread is omitted, the outer wall instead being furnished with longitudinal somewhat projecting ribs 4. A coupling sleeve 5 shaped interiorly as a threaded truncated cone is adapted to be screwed down on the branch 2. If the branch, as in the example, is fitted out with projecting ribs 4, the threads in the coupling sleeve 5 will cut threads in the projecting ribs 4 and simultaneously cut through the layer of varnish on the tube and cut threads in its exposed or bared part. The function of the threaded coupling sleeve 5 is thus two fold, namely as a locking device, and as a thread-cutting device in order to obtain good metallic contact between the tube 3 and the box 1 and thus ensure electrical continuity.

The projecting ribs 4 may be approximately 0.5 mm., i. e. approximately 1/50 of an inch in height and smooth. The branch 2 may, for instance, be fashioned from a solid part shaped as a truncated cone and drilled in such a way, with the axis of the drill parallel with one of the generatrices of the cone, so that the wall of the branch will be partly removed on one side, as shown. When the tube 3 is placed in the branch 2, the tube wall in a way makes up for the removed part of the branch. The device is handy and by its use one avoids the necessity of threading the ends of the tubes or conduits used with the junction box. When using varnished or coated tubes the device has the advantage that the sleeve 5 removes the coating, with the result that good electrical contact is obtained between tube 3 and box 1. The device is also suitable for cable ends or shoes where the end of an electric cable is fastened into a recessed branch by means of a threaded truncated conical sleeve.

Figure 2 shows the device applied to an otherwise ordinary cable shoe or tag. The shoe 1 is fitted with a recessed branch 2, shaped as previously described, and the cable 3 is locked in the branch by means of the threaded truncated conical sleeve 5, as described previously for the junction box (Figure 1). The branch 2 is also in this case fitted with longitudinal projecting ribs 4.

What I claim and desire to secure by Letters Patent is:

1. An electrical coupling device comprising a tubular branch having an outer wall of truncated conical shape with a gap in one side of said wall, an interiorly threaded truncated conical sleeve disposed over said tubular branch and its wall gap with a screwing movement, and a member in said connecting branch on which threads are formed by said threaded sleeve, thereby locking said member in position and providing electrical continuity between said member and an associated electrical fitting of which said branch is an extension.

2. A coupling device according to claim 1, in which longitudinally arranged projecting ribs are provided on the outer wall of the branch in which threads are cut during the screwing movement of said sleeve.

3. An electrical coupling device according to claim 1, in which said member is a tube and said electrical fitting is a junction box.

4. An electrical coupling device according to claim 1, in which said member is a cable and said electrical fitting is a cable shoe.

5. An electrical coupling device according to claim 1, in which said branch is exteriorly stepped at one end adjacent its juncture with said fitting and in which said sleeve has an end complementarily shaped to fit thereover.

6. In an electrical coupling device, a tubular branch having an outer wall of truncated conical shape with a gap in one side of said wall, and an interiorly threaded truncated conical sleeve disposed over said tubular branch and its wall gap with a screwing movement.

References Cited in the file of this patent

UNITED STATES PATENTS

| | | |
|---|---|---|
| 1,298,879 | Brown | Apr. 1, 1919 |
| 2,299,037 | Saueressig | Oct. 13, 1942 |

FOREIGN PATENTS

| | | |
|---|---|---|
| 104,417 | Switzerland | Apr. 16, 1924 |